United States Patent
Deshpande

(10) Patent No.: US 7,953,844 B2
(45) Date of Patent: May 31, 2011

(54) SYSTEMS AND METHODS FOR IMPLEMENTING AN INSTANT MESSAGING REMOTE CONTROL SERVICE

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 995 days.

(21) Appl. No.: 11/047,218

(22) Filed: Jan. 31, 2005

(65) Prior Publication Data

US 2006/0174010 A1    Aug. 3, 2006

(51) Int. Cl.
*G06F 15/173* (2006.01)

(52) U.S. Cl. ........ 709/224; 709/206; 709/208; 715/717; 715/740; 715/864; 715/744; 715/236

(58) Field of Classification Search .......... 709/224–231, 709/201–208; 379/211–212, 201.01–201.12, 379/218.01, 265.09; 715/716–719, 733–737, 715/741–747, 751–759, 864–866
See application file for complete search history.

(56) References Cited

U.S. PATENT DOCUMENTS

| | | | |
|---|---|---|---|
| 7,085,814 B1 * | 8/2006 | Gandhi et al. | 709/208 |
| 7,155,305 B2 * | 12/2006 | Hayes et al. | 700/224 |
| 7,184,848 B2 * | 2/2007 | Krzyzanowski et al. | 700/90 |
| 7,250,854 B2 * | 7/2007 | Rezvani et al. | 340/506 |
| 7,356,565 B2 * | 4/2008 | Zimmermann et al. | 709/206 |
| 7,454,469 B2 * | 11/2008 | Zhou et al. | 709/206 |
| 7,506,029 B2 * | 3/2009 | Sanjeeva et al. | 709/206 |
| 7,539,724 B1 * | 5/2009 | Callaghan | 709/205 |
| 7,669,213 B1 * | 2/2010 | Wick et al. | 725/37 |
| 2002/0029256 A1 | 3/2002 | Zintel et al. | |
| 2003/0014477 A1 | 1/2003 | Oppenheimer et al. | |
| 2003/0140107 A1 * | 7/2003 | Rezvani et al. | 709/208 |
| 2003/0167369 A1 | 9/2003 | Chen et al. | |
| 2004/0003073 A1 * | 1/2004 | Krzyzanowski et al. | 709/223 |
| 2004/0019683 A1 * | 1/2004 | Lee et al. | 709/227 |
| 2004/0148419 A1 | 7/2004 | Chen et al. | |

(Continued)

FOREIGN PATENT DOCUMENTS

EP    1 207 651    5/2002

(Continued)

OTHER PUBLICATIONS

AOL Instant Messenger Web Site, http://www.aim.com/.

(Continued)

*Primary Examiner* — William C. Vaughn, Jr.
*Assistant Examiner* — Greg Bengzon
(74) *Attorney, Agent, or Firm* — Austin Rapp & Hardman

(57) ABSTRACT

Systems and methods for implementing an instant messaging remote control service are disclosed. In an exemplary method, a control point discovers a device. The control point retrieves a device description associated with the device from the device. The device description includes a pointer to a description of a instant messaging remote control service. The control point also retrieves the instant messaging remote control service description from the device. The description of the instant messaging remote control service may define one or more actions for remotely controlling an instant messaging client that is running on the device. The description of the instant messaging remote control service may also define one or more evented state variables that model a state of the instant messaging client. The device may include an instant messaging client which can be remotely controlled using the instant messaging remote control service.

52 Claims, 10 Drawing Sheets

U.S. PATENT DOCUMENTS

| | | | |
|---|---|---|---|
| 2004/0162871 A1* | 8/2004 | Pabla et al. | 709/201 |
| 2004/0225741 A1 | 11/2004 | Tanimoto | |
| 2004/0267885 A1 | 12/2004 | Zimmermann et al. | |
| 2005/0188078 A1* | 8/2005 | Kotzin et al. | 709/224 |
| 2006/0026288 A1* | 2/2006 | Acharya et al. | 709/227 |
| 2006/0031367 A1* | 2/2006 | Buford et al. | 709/207 |
| 2006/0036703 A1* | 2/2006 | Fulmer et al. | 709/207 |
| 2006/0059237 A1* | 3/2006 | Wilcox | 709/206 |
| 2006/0069727 A1* | 3/2006 | Fuller et al. | 709/206 |
| 2006/0259632 A1* | 11/2006 | Crawford et al. | 709/229 |
| 2007/0174405 A1* | 7/2007 | Chen et al. | 709/207 |
| 2007/0271384 A1* | 11/2007 | Zmudzinski et al. | 709/227 |
| 2008/0049914 A1* | 2/2008 | Pounds et al. | 379/90.01 |
| 2008/0089506 A1* | 4/2008 | Pounds et al. | 379/218.01 |
| 2008/0189374 A1* | 8/2008 | Odell et al. | 709/206 |
| 2008/0250111 A1* | 10/2008 | Chen et al. | 709/206 |
| 2008/0288618 A1* | 11/2008 | Vardi et al. | 709/223 |
| 2009/0320073 A1* | 12/2009 | Reisman | 725/51 |

FOREIGN PATENT DOCUMENTS

| | | |
|---|---|---|
| JP | 2004-334721 | 11/2004 |
| WO | WO 01/10128 | 2/2001 |
| WO | WO 01/71992 | 9/2001 |
| WO | WO 02/32096 | 4/2002 |
| WO | WO 02/077840 | 10/2002 |
| WO | WO 03/047257 | 6/2003 |

OTHER PUBLICATIONS

MSN Messenger Web Site, http://www.msnmessenger-download.com/.

ICQ Instant Messenger Web Site, http://www.icq.com/.

Yahoo! Messenger Web Site, http://www.messenger.yahoo.com/.

Jabber Web Site, http://www.jabber.org/.

Universal Plug and Play Device Architecture, Version 1.0, Jun. 8, 2000, http://www.upnp.org/download/UPnPDA10__20000613.htm.

"Universal Plug and Play in Windows XP", Tom Fout, Aug. 8, 2001, http://www.microsoft.com/technet/prodtechnol/winxppro/evaluate/upnpxp.mspx.

Office Action issued for Japanese Patent Application No. 2006-022432 on Jul. 6, 2010.

* cited by examiner

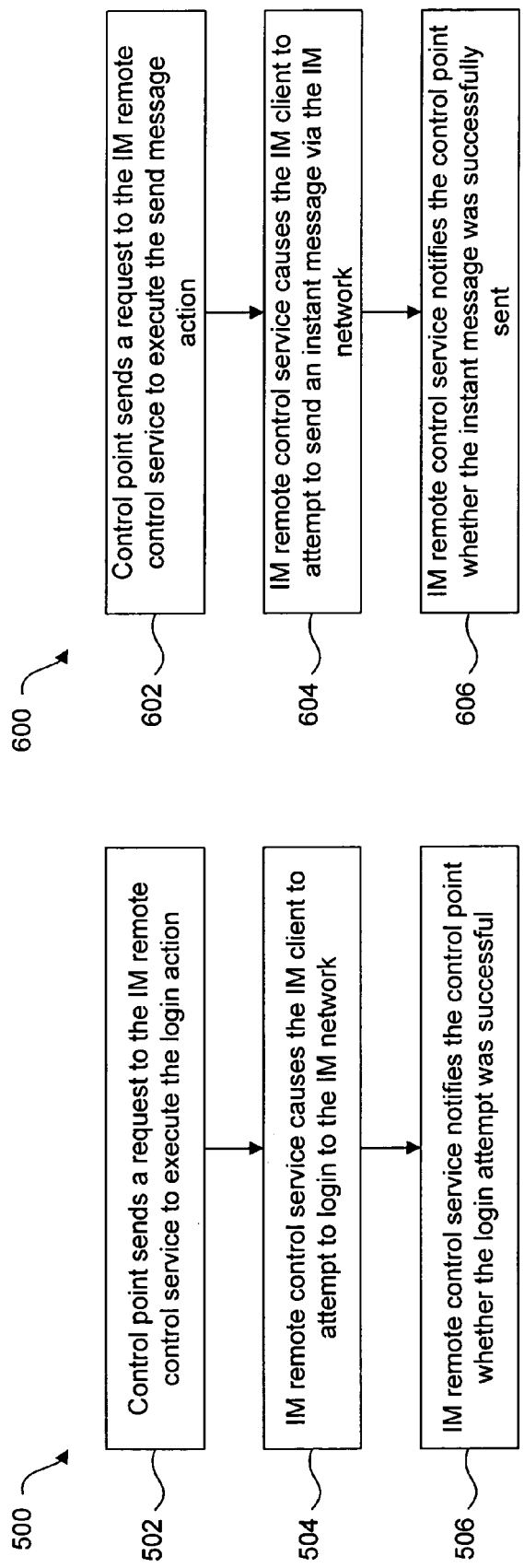

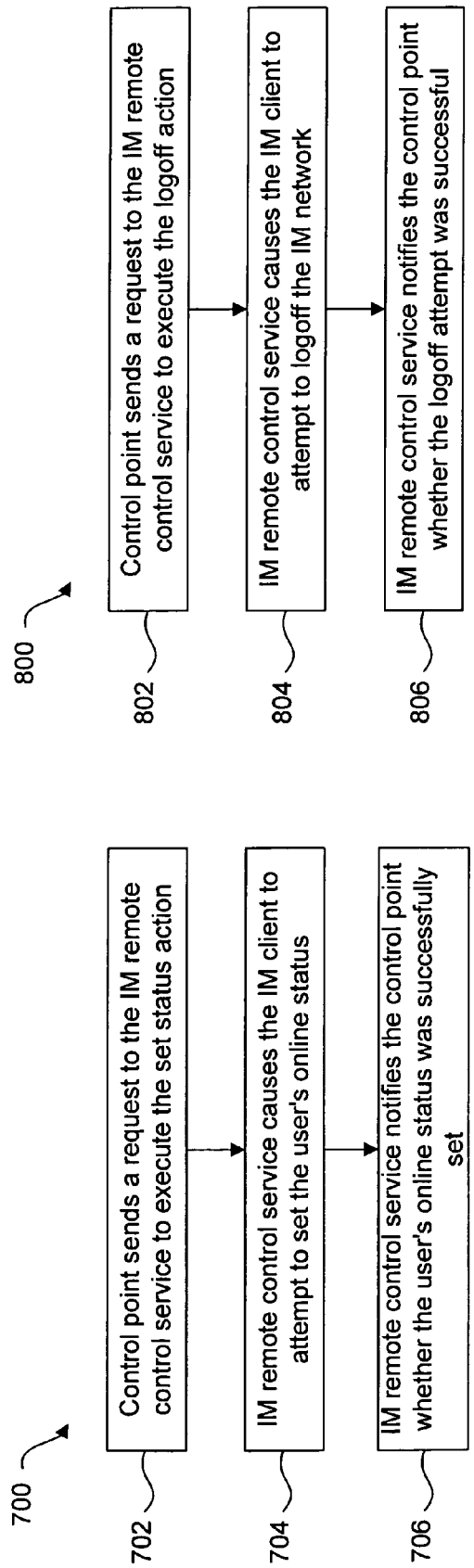

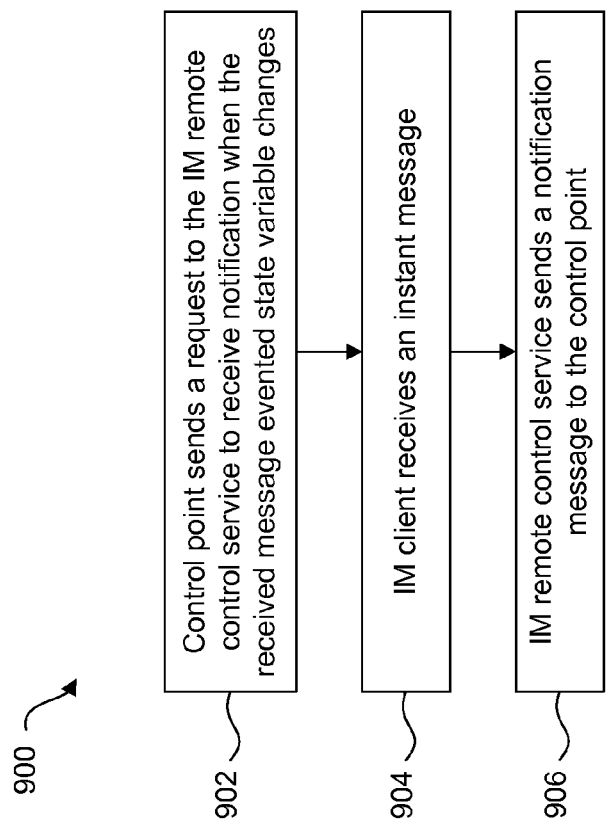

Submit Action SendMessage

| recipient | username 2 | string |
| user | username 1 | string |
| msg | Hi, Can I call you now? | string |

[OK] [Cancel]

FIG. 11A

Return Value of SendMessage sendStatus  Message Sent

SYSTEMS AND METHODS FOR IMPLEMENTING AN INSTANT MESSAGING REMOTE CONTROL SERVICE

TECHNICAL FIELD

The present invention relates generally to computers and computer-related technology. More specifically, the present invention relates to systems and methods for implementing an instant messaging remote control service.

BACKGROUND

Instant messaging refers to the process of exchanging text messages between two or more people. Instant messaging differs from e-mail in that conversations happen in realtime. The parties in the conversation typically see each line of text right after it is typed (line-by-line). To some people instant messaging seems more like a telephone conversation than exchanging letters. Also known as a "chatting," instant messaging has become very popular for both business and personal use. Instant messaging is often used as a way to avoid telephone tag, whether the communication continues as text messages or winds up as a traditional phone call.

An instant messaging (hereinafter, "IM") client is a client which connects to an IM service. Many different IM clients are known to those skilled in the art. Examples of IM clients include Yahoo! Messenger, MSN Messenger, America Online's Instant Messenger (AIM), and so forth.

IM clients allow a user to send and receive instant messages via an instant messaging network (e.g., the Internet). Many known IM clients also allow a user to convey an "online status" to other users. For example, some IM clients allow a user to set her/his online status to one of various predefined statuses, such as "Invisible," "Busy," "On The Phone," etc. Some known IM clients offer additional functionality, such as the ability to be notified when a "buddy" (i.e., someone in the user's contact list) changes her/his online status, the ability to send and receive files (including audio/video files), etc.

Currently, an IM client running on a device allows a user to send and receive instant messages from that device. However, known IM clients do not have the ability to allow a user to send instant messages from or receive instant messages at one or more other devices. In other words, known IM clients do not allow instant messages to be sent and received remotely through the IM client.

Universal Plug and Play (UPnP) is an architecture for pervasive peer-to-peer networking of a wide variety of electronic devices, including personal computers, personal digital assistants (PDAs), television set-top boxes, cellular telephones, intelligent appliances, and so forth. UPnP defines a set of common protocols that devices use to join a network and describe themselves and their capabilities, which enables other devices and people to use them without setup or configuration.

In view of the foregoing, benefits may be realized by systems and methods for implementing an instant messaging remote control service.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 5 illustrates an embodiment of a method that may be performed by the various components in the system of FIG. 1 when a control point invokes a login action of the IM remote control service;

FIG. 6 illustrates an embodiment of a method that may be performed by the various components in the system of FIG. 1 when a control point invokes a send message action of the IM remote control service;

FIG. 7 illustrates an embodiment of a method that may be performed by the various components in the system of FIG. 1 when a control point invokes a set status action of the IM remote control service;

FIG. 8 illustrates an embodiment of a method that may be performed by the various components in the system of FIG. 1 when a control point invokes a logoff action of the IM remote control service;

FIG. 9 illustrates an embodiment of a method that may be performed by the various components in the system of FIG. 1 when a control point subscribes to a received message evented state variable of the IM remote control service;

FIGS. 10A and 10B are screen shots corresponding to the invocation of the login action of an exemplary implementation of the IM remote control service;

FIGS. 11A and 11B are screen shots corresponding to the invocation of the send message action of an exemplary implementation of the IM remote control service;

DETAILED DESCRIPTION

Figure 1:
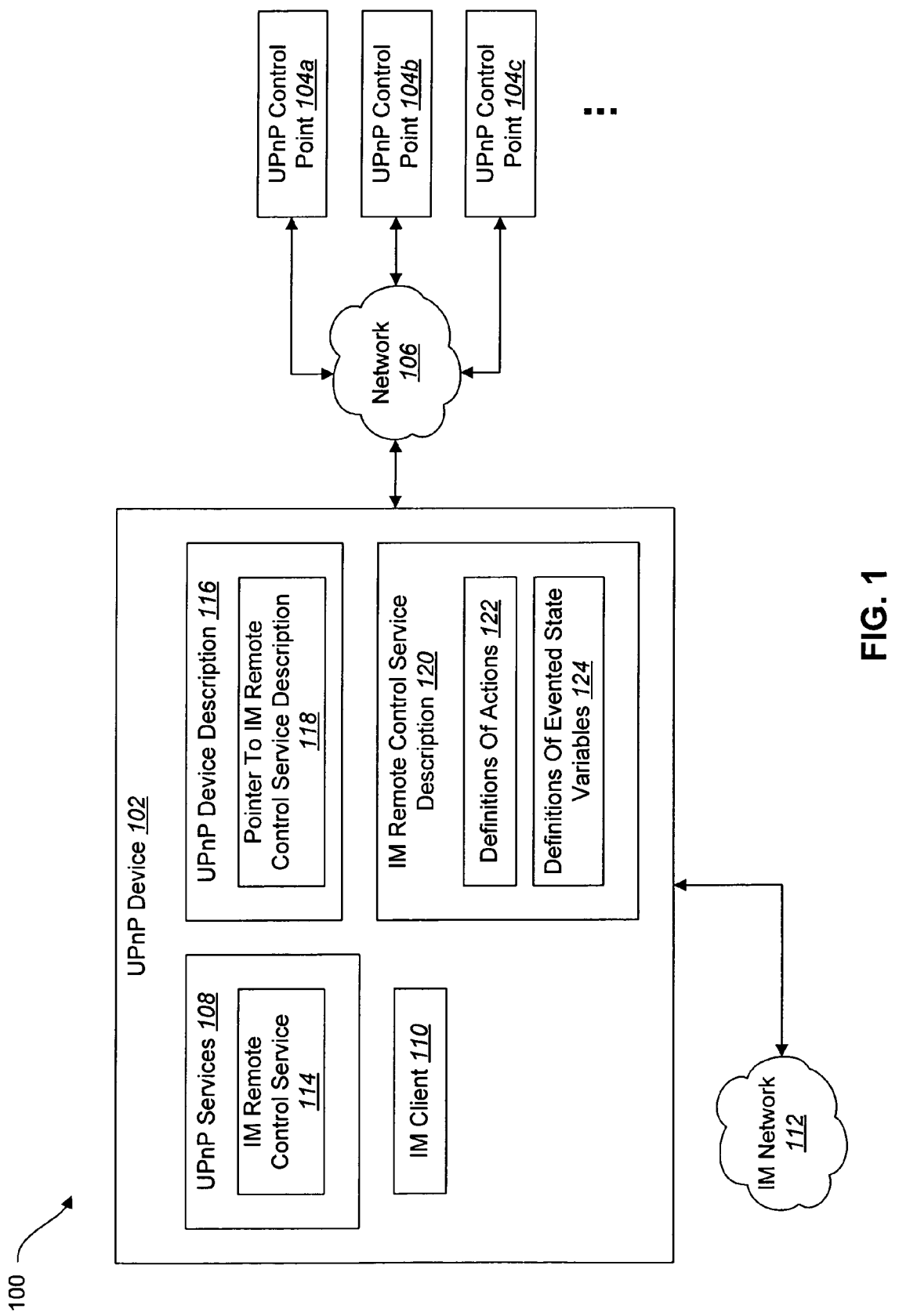
FIG. 1 illustrates an exemplary system in which some embodiments may be practiced.

A computer-readable medium comprising executable instructions for implementing a method in a device that is connected to a network is disclosed. The method involves facilitating discovery of the device by a control point that is also connected to the network. The method also involves transmitting a device description associated with the device to the control point. The device description comprises a pointer to a description of an instant messaging remote control service. The method also involves transmitting the description of the instant messaging remote control service to the control point. The description of the instant messaging remote control service defines an action for remotely controlling an instant messaging client that is running on the device and/or an evented state variable that models a state of the instant messaging client. In some embodiments, the device is a UPnP device, the control point is a UPnP control point, and the instant messaging remote control service is a UPnP instant messaging remote control service.

In some embodiments, the description of the instant messaging remote control service defines a login action. In such embodiments, the method may also involve receiving a request from the control point to execute the login action. The method may also involve, in response to receiving the request, causing the instant messaging client to attempt to login to an instant messaging network. The login action may take an instant messaging username and password as input information. The method may also involve returning a status of the login action to the control point.

In some embodiments, the description of the instant messaging remote control service defines a send message action. In such embodiments, the method may also involve receiving a request from the control point to execute the send message action. The method may also involve, in response to receiving the request, causing the instant messaging client to attempt to send an instant message via an instant messaging network. The send message action may take an instant messaging username and password as input information. The method may also involve returning a status of the send message action to the control point.

In some embodiments, the description of the instant messaging remote control service defines a set status action. In such embodiments, the method may also involve receiving a request from the control point to execute the set status action. The method may also involve, in response to receiving the request, causing the instant messaging client to attempt to set an online status of a user of the instant messaging client. The set status action may take an instant messaging username and password as input information. The method may also involve returning a status of the set status action to the control point.

In some embodiments, the description of the instant messaging remote control service defines a logoff action. In such embodiments, the method may also involve receiving a request from the control point to execute the logoff action. The method may also involve, in response to receiving the request, causing the instant messaging client to attempt to logoff an instant messaging network. The logoff action may take an instant messaging username and password as input information. The method may also involve returning a status of the logoff action to the control point.

In some embodiments, the description of the instant messaging remote control service defines an add buddy action. In such embodiments, the method may also involve receiving a request from the control point to execute the add buddy action. The method may also involve, in response to receiving the request, causing the instant messaging client to attempt to add a buddy to a buddy list. The add buddy action may take an instant messaging username and password as input information. The method may also involve returning a status of the add buddy action to the control point.

In some embodiments, the description of the instant messaging remote control service defines a remove buddy action. In such embodiments, the method may also involve receiving a request from the control point to execute the remove buddy action. The method may also involve, in response to receiving the request, causing the instant messaging client to attempt to remove a buddy from a buddy list. The remove buddy action may take an instant messaging username and password as input information. The method may also involve returning a status of the remove buddy action to the control point.

In some embodiments, the description of the instant messaging remote control service defines a received message evented state variable. In such embodiments, the method may also involve receiving a subscription message from the control point. The subscription message comprises a request to receive notification when the received message evented state variable changes. The method may also involve, in response to the instant messaging client receiving an instant message via an instant messaging network, sending a notification message to the control point. The notification message comprises the instant message.

In some embodiments, the description of the instant messaging remote control service defines a buddy list evented state variable. In such embodiments, the method may also involve receiving a subscription message from the control point. The subscription message comprises a request to receive notification when the buddy list evented state variable changes. The method may also involve, in response to the instant messaging client receiving a buddy list via an instant messaging network, sending a notification message to the control point. The notification message comprises the buddy list.

In some embodiments, the description of the instant messaging remote control service defines a buddy status evented state variable. In such embodiments, the method may also involve receiving a subscription message from the control point. The subscription message comprises a request to receive notification when the buddy status evented state variable changes. The method may also involve, in response to the instant messaging client receiving notification via an instant messaging network of a status of a buddy, sending a notification message to the control point. The notification message comprises an indication of the status of the buddy.

In some embodiments, the description of the instant messaging remote control service defines a buddy activity indication evented state variable. In such embodiments, the method may also involve receiving a subscription message from the control point. The subscription message comprises a request to receive notification when the buddy activity indication evented state variable changes. The method may also involve, in response to the instant messaging client receiving notification via an instant messaging network of an action being taken by a buddy, sending a notification message to the control point. The notification message comprises an indication of the action being taken by the buddy.

A computer-readable medium comprising executable instructions for implementing a method in a control point that is connected to a network is also disclosed. The method involves discovering a device that is also connected to the network. The method also involves retrieving a device description associated with the device. The device description comprises a pointer to a description of an instant messaging remote control service. The method also involves retrieving the description of the instant messaging remote control service from the device. The description of the instant messaging remote control service defines an action for remotely controlling an instant messaging client that is running on the device and/or an evented state variable that models a state of the instant messaging client.

A device that is configured for electronic communication with a network is also disclosed. The device includes a processor and memory in electronic communication with the processor. Instructions are stored in the memory. The instructions are executable to implement a method that involves connecting to the network. The method also involves facilitating discovery of the device by a control point that is also connected to the network. The method also involves transmitting a device description associated with the device to the control point. The device description comprises a pointer to a description of an instant messaging remote control service. The method also involves transmitting the description of the instant messaging remote control service to the control point. The description of the instant messaging remote control service defines an action for remotely controlling an instant messaging client that is running on the device and/or an evented state variable that models a state of the instant messaging client.

A control point that is configured for electronic communication with a network is also disclosed. The control point includes a processor and memory in electronic communication with the processor. Instructions are stored in the memory. The instructions are executable to implement a method that involves connecting to the network. The method also involves discovering a device that is also connected to the network. The method also involves retrieving a device description associated with the device. The device description comprises a pointer to a description of an instant messaging remote control service. The method also involves retrieving the description of the instant messaging remote control service from the device. The description of the instant messaging remote control service defines an action for remotely controlling an instant messaging client that is running on the device and/or an evented state variable that models a state of the instant messaging client.

A method in a device that is connected to a network is also disclosed. The method involves facilitating discovery of the device by a control point that is also connected to the network. The method also involves transmitting a device description associated with the device to the control point. The device description comprises a pointer to a description of an instant messaging remote control service. The method also involves transmitting the description of the instant messaging remote control service to the control point. The description of the instant messaging remote control service defines an action for remotely controlling an instant messaging client that is running on the device and/or an evented state variable that models a state of the instant messaging client.

A method in a control point that is connected to a network is also disclosed. The method involves discovering a device that is also connected to the network. The method also involves retrieving a device description associated with the device. The device description comprises a pointer to a description of an instant messaging remote control service. The method also involves retrieving the description of the instant messaging remote control service from the device. The description of the instant messaging remote control service defines an action for remotely controlling an instant messaging client that is running on the device and/or an evented state variable that models a state of the instant messaging client.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software components stored in a computing device. The term software component, as used herein, refers to any collection of one or more computer-executable instructions stored in a memory device. A software component may comprise a single instruction, or many instructions. The instructions may be organized as a routine, program, object, or the like. Moreover, the instructions within a software component may be distributed over different code segments, different programs, different locations of the same memory device, and/or different memory devices.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 illustrates an exemplary system 100 in which some embodiments may be practiced. The system 100 includes a UPnP device 102 and at least one UPnP control point 104. More specifically, the system 100 shown in FIG. 1 includes a first UPnP control point 104a, a second UPnP control point 104b, and a third UPnP control point 104c.

The UPnP device 102 and the UPnP control points 104 are computing devices. A "computing device," as that term is used herein, may be any electronic device that includes a digital processor capable of receiving and processing data. Examples of computing devices include televisions, personal computers, personal digital assistants (PDAs), television set-top boxes, cellular telephones, intelligent appliances, and so forth. Both the UPnP device 102 and the UPnP control points 104 include various software components for implementing the methods described herein.

The UPnP device 102 and the UPnP control points 104 are in electronic communication with one another via a computer network 106. Many different types of computer networks 106 are known to those skilled in the art. Embodiments disclosed herein are not limited to any particular type of computer network 106.

The UPnP device 102 includes one or more UPnP services 108. The UPnP services 108 are software components, as that term is defined above. Each UPnP service 108 exposes certain functionality to the UPnP control points 104.

The UPnP device 102 also includes an instant messaging (hereinafter, "IM") client 110. The IM client 110 allows a user to send and receive instant messages to other users who are also connected to an IM network 112 (such as the Internet). Examples of IM clients 110 include Yahoo! Messenger, MSN Messenger, America Online's Instant Messenger (AIM), and so forth.

One of the UPnP services 108 on the UPnP device 102 is an instant messaging (hereinafter, "IM") remote control service 114. The IM remote control service 114 allows a UPnP control point 104 to remotely control the IM client 110 on the UPnP device 102. More specifically, the IM remote control service 114 exposes certain actions and maintains certain evented state variables. The UPnP control points 104 may invoke actions that are exposed by the IM remote control service 114 and may subscribe to evented state variables that are maintained by the IM remote control service 114. The actions and variables relate to allowing a control point 104 to utilize, from a remote location, the functionality of the IM client 110. For example, a user of a control point 104 may be able to login to the IM network 112, send instant messages, receive instant messages, and so forth. Some exemplary actions and evented state variables will be described below.

The UPnP device 102 also includes a UPnP device description 116. The UPnP device 102 can send its device description 116 to other devices that are connected to the network 106, such as the UPnP control points 104. The device description 116 may be used by the control points 104 to "discover" the UPnP device 102 and to determine the UPnP services 108 that are offered by the UPnP device 102. For example, when a control point 104 receives the device description 116 it becomes aware that the UPnP device 102 is connected to the network 106 and that the IM remote control service 114 is available from the UPnP device 102.

The device description 116 may include a pointer 118 to a description 120 of the IM remote control service 114. The IM remote control service description 120 enables control points 104 to determine how to utilize the functionality offered by the IM remote control service 114. The IM remote control service description 120 includes definitions 122 of actions that are offered by the IM remote control service 114 and definitions 124 of evented state variables that are maintained by the IM remote control service 114.

Although the system 100 shown in FIG. 1 is described as having UPnP functionality, the inventive principles disclosed herein are applicable within systems that are not configured for communication in accordance with the UPnP protocol. Thus some embodiments may be practiced in a system that includes an electronic device (instead of a UPnP device 102) and one or more control points (instead of the UPnP control points 104). For clarity, however, the embodiments described herein will be described as having UPnP functionality.

Figure 2:
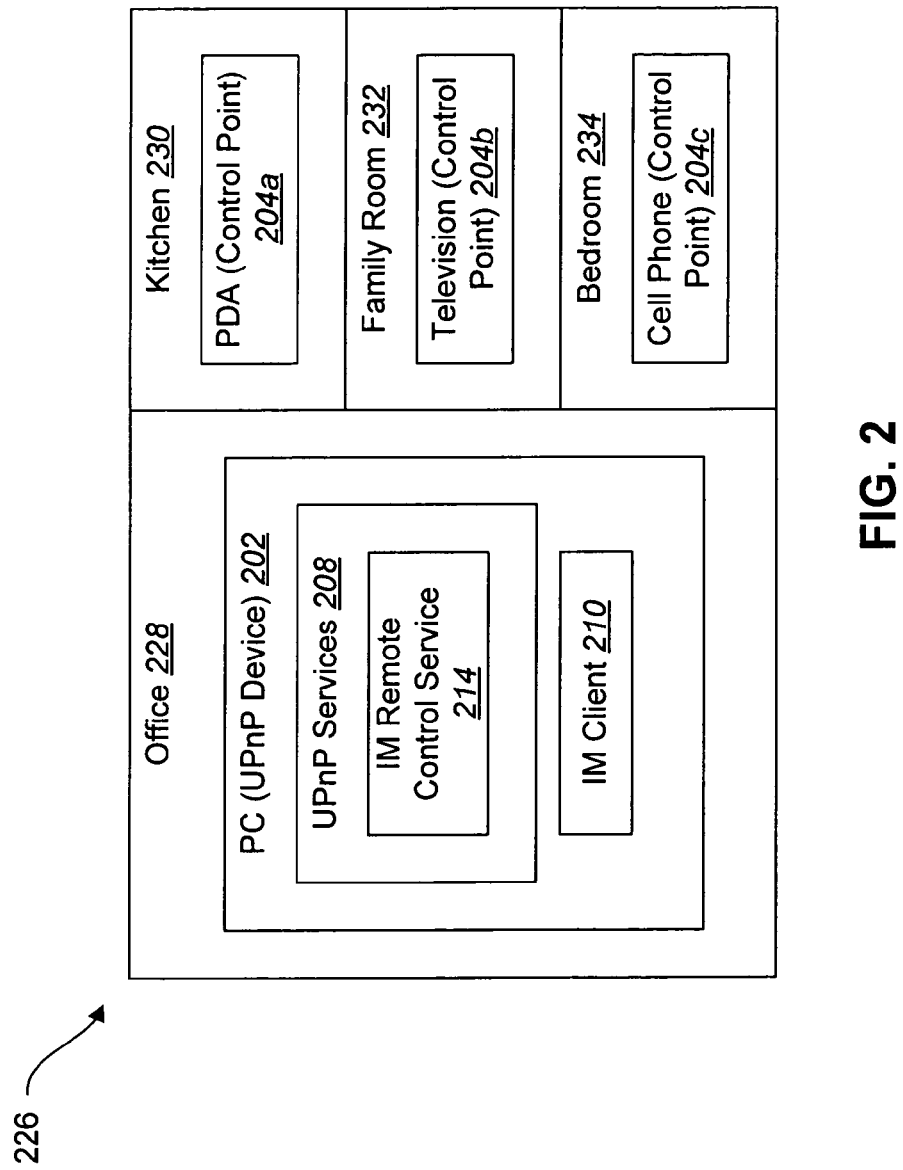
FIG. 2 illustrates an exemplary environment in which the system shown in FIG. 1 may be implemented.

FIG. 2 illustrates an exemplary environment in which the system 100 shown in FIG. 1 may be implemented. The different components of the system 100 are located within a home 226. A personal computer 202 is located in an office 228 within the home 226. The personal computer 202 is a UPnP device 202. The personal computer 202 includes one or more UPnP services 208, including an IM remote control service 214. The personal computer 202 also includes an IM client 210.

A personal digital assistant ("PDA") 204a is located in a kitchen 230 within the home 226. The PDA 204a is a first UPnP control point 204a. In other words, the PDA 204a includes various software components which allow it to implement at least some of the methods described herein for UPnP control points.

A television 204b is located in a family room 232 within the home 226. The television 204b is a second UPnP control point 204b.

A cell phone 204c is located in a bedroom 234 within the home 226. The cell phone 204c is a third UPnP control point 204c.

Suppose that a person named Bob lives at the home 226. Bob may use an IM client 210 running on the personal computer 202 within the office 228 to login to an IM network (not shown). After Bob has logged in to the IM network, Bob may move to different areas of the home 226. For example, Bob may move to the kitchen 230 to have a snack, to the family room 232 to watch television, to the bedroom 234 to make a phone call, etc. The IM remote control service 214 makes it possible for Bob to use the IM client 210 to send and receive instant messages even when Bob is away from the personal computer 202.

For example, suppose that Bob is watching television in the family room 232. If Bob receives an instant message from one of his friends during this time, the IM remote control service 214 may be configured so that the instant message is forwarded to the television set-top box 204b, where it may be displayed on the television. The IM remote control service 214 may also be configured so that Bob can respond to the instant message and/or send a new instant message to a different person while he is in the family room 232 watching television. In a similar manner, Bob can also utilize the functionality of the IM client 210 while in the kitchen 230 (via the PDA 204a) or the bedroom (via the cell phone 204c).

Figure 3:
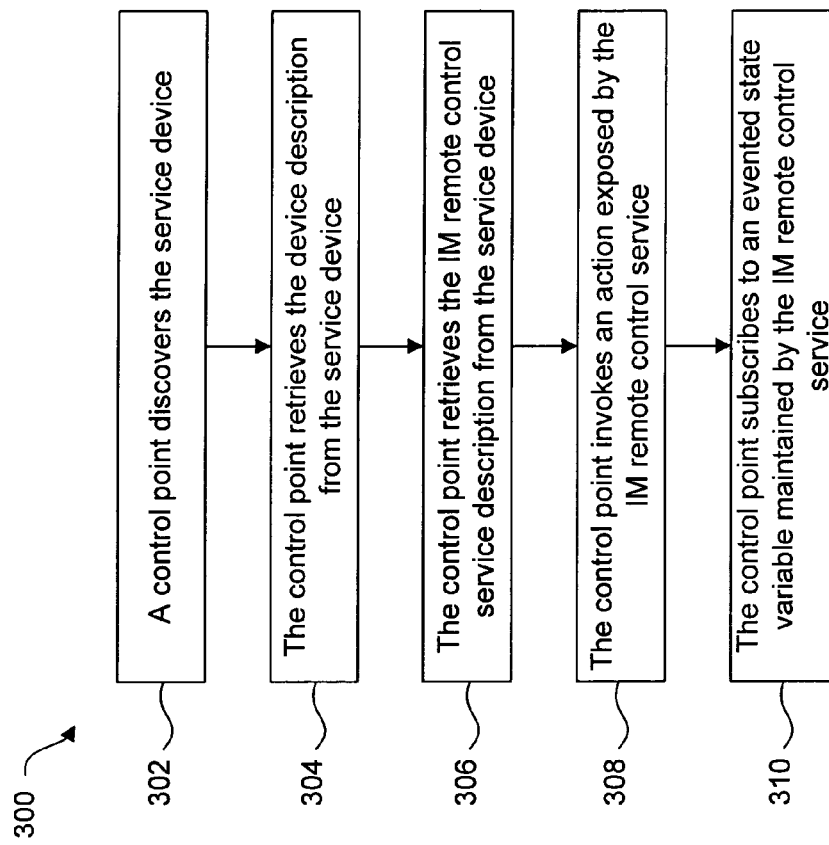
FIG. 3 illustrates an embodiment of a method that may be performed by the various components in the system of FIG. 1.

FIG. 3 illustrates an embodiment of a method 300 that may be performed by the various components in the system 100 of FIG. 1. In step 302 of the method 300, a control point 104 discovers the UPnP device 102. In some embodiments, this involves the UPnP device 102 sending an advertisement message to the control point 104. The discovery message may include a pointer (e.g., URL) to the device description 116 for the UPnP device 102. The discovery message may also include some other information about the UPnP device 102 or about the UPnP services 108 available on the UPnP device 102.

In step 304, the control point 104 retrieves the device description 116 from the UPnP device 102. As indicated above, in some embodiments the discovery message may include a pointer to the device description 116 for the UPnP device 102. In such embodiments, retrieving the device description 116 may involve sending a request to the UPnP device 102 for the file that is identified by this pointer.

In step 306, the control point 104 retrieves the description 120 of the IM remote control service 114 from the UPnP device 102. As indicated above, in some embodiments the device description 116 for the UPnP device 102 may include a pointer 118 to the IM remote control service description 120. In such embodiments, retrieving the IM remote control service description 120 may involve sending a request to the UPnP device 102 for the file that is identified by this pointer 118.

In step 308, the control point 104 invokes an action exposed by the IM remote control service 114. In some embodiments, this involves sending an action request to the IM remote control service 114. The action request may be included within a control message that is sent to a control URL for the IM remote control service 114 (which may be provided in the device description 116).

In step 310, the control point 104 subscribes to an evented state variable that is maintained by the IM remote control service 114. In some embodiments, this involves sending a subscription request to the IM remote control service 114. The subscription request may be included within a control message that is sent to the control URL for the IM remote control service 114.

Figure 4:
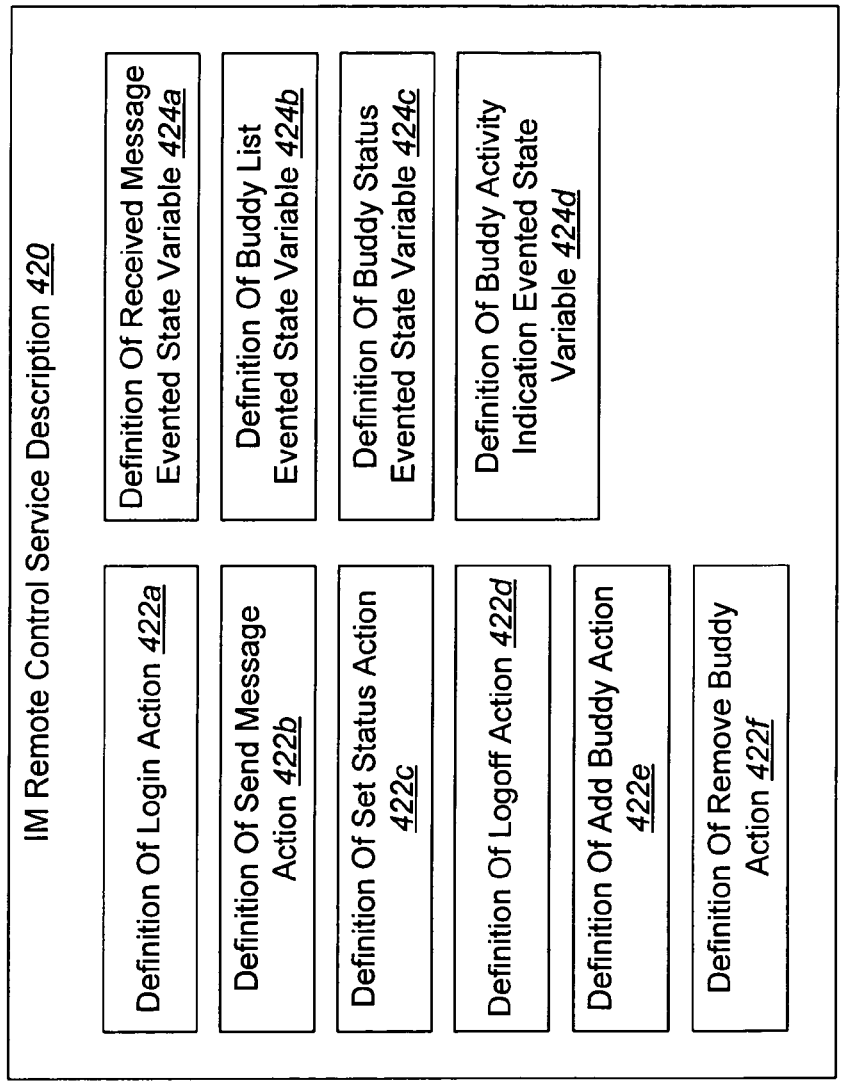
FIG. 4 illustrates an embodiment of an IM remote control service description.

FIG. 4 illustrates an embodiment of the IM remote control service description 420. The IM remote control service description 420 includes a definition 422a of a login action, a definition 422b of a send message action, a definition 422c of a set status action, a definition 422d of a logoff action, a definition 422e of an add buddy action, and a definition 422f of a remove buddy action. The IM remote control service description 420 also includes a definition 424a of a received message evented state variable, a definition 424b of a buddy list evented state variable, a definition 424c of a buddy status evented state variable, and a definition 424d of a buddy activity indication evented state variable 424d. The login action, send message action, set status action, logoff action, add buddy action, remove buddy action, received message evented state variable, received message evented state variable, buddy list evented state variable, buddy status evented state variable, and buddy activity indication evented state variable will be described in greater detail below.

FIG. 5 illustrates an embodiment of a method 500 that may be performed by the various components in the system 100 of FIG. 1 when a control point 104 invokes the login action. In step 502 of the method 500, the control point 104 sends a request to the IM remote control service 114 to execute the login action. In some embodiments, the login action may be defined to accept various input arguments, such as a username and a password for the user of the IM client 110, the service provider corresponding to the IM client 110 (e.g., Yahoo!, AOL, MSN, etc.), and so forth. The request that the control point 104 sends to the IM remote control service 114 in step 502 may include the input arguments that are defined for the login action.

In step 504, the IM remote control service 114 causes the IM client 110 to attempt to login to the IM network 106. The IM client 110 may use the username and the password that were provided in the request sent from the control point 104 to login into the IM network 106. In some embodiments, the password may be encrypted, and the UPnP device 102 may be configured to decrypt the password.

In step 506, the IM remote control service 114 notifies the control point 104 whether the login attempt was successful. This may involve sending the control point 104 a success/ error code (e.g., a fixed N-digit code) followed by an appropriate text string (e.g., "logged in" for a successful login; "not logged in" for a failed login attempt).

FIG. 6 illustrates an embodiment of a method 600 that may be performed by the various components in the system 100 of FIG. 1 when a control point 104 invokes the send message action. In step 602 of the method 600, the control point 104 sends a request to the IM remote control service 114 to execute the send message action. In some embodiments, the send message action may be defined to accept various input arguments, such as a username for the intended recipient of the instant message, a username and password for the user who is sending the instant message, the instant message to be sent, and so forth. The request that the control point 104 sends to the IM remote control service 114 in step 602 may include the input arguments that are defined for the send message action.

If the IM remote control service 114 is defined in such a way that only a single remote user can be supported at any time, then the username and password arguments may not be required. Of course, the IM remote control service 114 may be designed to support multiple remote users, using the same and/or different usernames.

In some embodiments, after a control point 104 successfully invokes the login action, the IM remote control service 114 returns a sessionID parameter to the control point 104. In such embodiments, the send message action may be defined to accept an input argument that specifies the sessionID parameter. The sessionID parameter may be provided instead of the username and password of the user that is sending the instant message.

In step 604, the IM remote control service 114 causes the IM client 110 to attempt to send an instant message via the IM network 106. In step 606, the IM remote control service 114 notifies the control point 104 whether the instant message was successfully sent. This may involve sending the control point 104 a success/error code followed by an appropriate text string (e.g., "message sent" if the message was successfully sent; "message not sent" for a failed attempt).

FIG. 7 illustrates an embodiment of a method 700 that may be performed by the various components in the system 100 of FIG. 1 when a control point 104 invokes the set status action. In step 702 of the method 700, the control point 104 sends a request to the IM remote control service 114 to execute the set status action. In some embodiments, the set status action may be defined to accept various input arguments, such as a username and password for the user of the IM client 110, the desired online status, and so forth. The request that the control point 104 sends to the IM remote control service 114 in step 702 may include the input arguments that are defined for the set status action.

In step 704, the IM remote control service 114 causes the IM client 110 to attempt to set the user's online status. The online status may be set based on the statuses that are supported by the IM client 110. For example, some IM clients 110 allow setting a user's online status to "Invisible," "Busy," "On The Phone," etc. Alternatively, custom status messages may be allowed.

In step 706, the IM remote control service 114 notifies the control point 104 whether the user's online status was successfully set. This may involve sending the control point 104 a success/error code followed by an appropriate text string (e.g., "status set" if the online status was successfully set; "status not set" for a failed attempt).

FIG. 8 illustrates an embodiment of a method 800 that may be performed by the various components in the system 100 of FIG. 1 when a control point 104 invokes the logoff action. In step 802 of the method 800, the control point 104 sends a request to the IM remote control service 114 to execute the logoff action. In some embodiments, the logoff action may be defined to accept various input arguments, such as a username and password for the user of the IM client 110. The request that the control point 104 sends to the IM remote control service 114 in step 802 may include the input arguments that are defined for the logoff action.

In step 804, the IM remote control service 114 causes the IM client 110 to attempt to logoff the IM network 106. The IM client 110 may use the username and the password that were provided in the request sent from the control point 104 to logoff the IM network 106. In some embodiments, the password may be encrypted, and the UPnP device 102 may be configured to decrypt the password.

In step 806, the IM remote control service 114 notifies the control point 104 whether the logoff attempt was successful. This may involve sending the control point 104 a success/ error code followed by an appropriate text string (e.g., "logoff successful" if the logoff attempt was successful; "logoff not successful" for a failed attempt).

A method similar to those shown in FIGS. 5-8 may be performed when a control point 104 invokes the add buddy action. More specifically, the control point 104 may send an IM remote control service a request to execute the add buddy action. In response, the IM remote control service causes the IM client 110 to attempt to add a buddy to a buddy list. The add buddy action may take an IM username and password as input information. A status of the add buddy action may be returned to the control point.

A method similar to those shown in FIGS. 5-8 may be performed when a control point 104 invokes the remove buddy action. More specifically, the control point 104 may send an IM remote control service a request to execute the remove buddy action. In response, the IM remote control service causes the IM client 110 to attempt to remove a buddy from a buddy list. The remove buddy action may take an IM username and password as input information. A status of the remove buddy action may be returned to the control point.

FIG. 9 illustrates an embodiment of a method 900 that may be performed by the various components in the system 100 of FIG. 1 when a control point 104 subscribes to the received message evented state variable. In step 902 of the method 900, the control point 104 sends a request to the IM remote control service 114 to receive notification when the received message evented state variable changes.

In step 904, the IM client 110 receives an instant message that is sent by another IM user. In step 906, the IM remote control service 114 sends a notification message to the control point 104. The notification message informs the control point 104 that an instant message from another IM user was received. The notification message may include the instant message that was received by the IM client 110.

A method similar to that shown in FIG. 9 may be performed when a control point 104 subscribes to the buddy list evented state variable. Specifically, an IM remote control service may receive a subscription message from the control point. The subscription message includes a request to receive notification when the buddy list evented state variable changes. In response to the IM client receiving a buddy list via an IM network, the IM remote control service sends a notification message to the control point. The notification message includes the buddy list.

A method similar to that shown in FIG. 9 may also be performed when a control point 104 subscribes to the buddy status evented state variable. Specifically, an IM remote control service may receive a subscription message from the control point. The subscription message includes a request to receive notification when the buddy status evented state variable changes. In response to the IM client receiving notification via an IM network of a status of a buddy, the IM remote control service sends a notification message to the control point. The notification message includes an indication of the status of the buddy.

A method similar to that shown in FIG. 9 may also be performed when a control point 104 subscribes to the buddy activity indication evented state variable. Specifically, an IM remote control service may receive a subscription message from the control point. The subscription message includes a request to receive notification when the buddy activity indication evented state variable changes. In response to the IM client receiving notification via an IM network of an action being taken by a buddy, the IM remote control service sends a notification message to the control point. The notification message includes an indication of the action being taken by the buddy.

In addition to the functionality described above, the IM remote control service 114 may expose additional functionality to the control points 104. Indeed, the IM remote control service 114 may expose all the functionality supported by the IM client 110. The additional actions may include the ability to send and receive audio messages; the ability to send and receive video messages; the ability to send and receive files to and from IM buddies; the ability to be notified of buddy statuses and other presence information including when a buddy comes online and/or goes offline, when a buddy changes its status, and/or when a buddy is typing a message while in an IM conversation, etc.; the ability to add and/or remove buddies; the ability to receive buddy lists when a user with a username logs in; the ability to conference with multiple buddies in a conference session; and so forth.

Some of the above IM functionality may be exposed by the IM client 110 as a UPnP action. Some of the above functionality may be exposed by the IM client 110 via an evented state variable. In some embodiments, the IM remote control service 114 exposes actions which allow a message/status to be "sent" from the user to her/his IM buddies, and evented state variables which allow a message/status to be "received" by a user from her/his IM buddies.

A description of an exemplary IM remote control service will now be provided. The description is written in XML.

```xml
<?xml version="1.0" ?>
<scpd xmlns="urn:schemas-upnp-org:service-1-0">
    <specVersion>
        <major>1</major>
        <minor>0</minor>
    </specVersion>
    <actionList>
        <action>
            <name>Login</name>
            <argumentList>
                <argument>
                    <name>state</name>
                    <relatedStateVariable>State</relatedStateVariable>
                    <direction>out</direction>
                </argument>
                <argument>
                    <name>user</name>
                    <relatedStateVariable>Username</relatedStateVariable>
                    <direction>in</direction>
                </argument>
                <argument>
                    <name>passwd</name>
                    <relatedStateVariable>Password</relatedStateVariable>
                    <direction>in</direction>
                </argument>
            </argumentList>
        </action>
        <action>
            <name>Logoff</name>
            <argumentList>
                <argument>
                    <name>state</name>
                    <relatedStateVariable>State</relatedStateVariable>
                    <direction>out</direction>
                </argument>
                <argument>
                    <name>user</name>
                    <relatedStateVariable>Username</relatedStateVariable>
                    <direction>in</direction>
                </argument>
                <argument>
                    <name>passwd</name>
                    <relatedStateVariable>Password</relatedStateVariable>
                    <direction>in</direction>
                </argument>
            </argumentList>
        </action>
        <action>
            <name>SendMessage</name>
            <argumentList>
                <argument>
                    <name>sendStatus</name>
                    <relatedStateVariable>SendStatus</relatedStateVariable>
                    <direction>out</direction>
                </argument>
                <argument>
                    <name>recipient</name>
                    <relatedStateVariable>Recipient</relatedStateVariable>
                    <direction>in</direction>
                </argument>
                <argument>
                    <name>user</name>
                    <relatedStateVariable>Username</relatedStateVariable>
                    <direction>in</direction>
                </argument>
                <argument>
                    <name>msg</name>
                    <relatedStateVariable>Message</relatedStateVariable>
                    <direction>in</direction>
                </argument>
            </argumentList>
        </action>
        <action>
            <name>SetStatus</name>
            <argumentList>
                <argument>
                    <name>status</name>
                    <relatedStateVariable>Status</relatedStateVariable>
                    <direction>out</direction>
                </argument>
```

-continued

```
       -<argument>
           <name>user</name>
               <relatedStateVariable>Username</relatedStateVariable>
               <direction>in</direction>
           </argument>
       -<argument>
           <name>currentstatus</name>
               <relatedStateVariable>Status</relatedStateVariable>
               <direction>in</direction>
           </argument>
       </argumentList>
   </action>
 </actionList>
-<serviceStateTable>
   -<stateVariable sendEvents="yes">
       <name>state</name>
       <dataType>string</dataType>
       <defaultValue>null</defaultValue>
   </stateVariable>
   -<stateVariable sendEvents="no">
       <name>Username</name>
       <dataType>string</dataType>
       <defaultValue>null</defaultValue>
   </stateVariable>
   -<stateVariable sendEvents="no">
       <name>Password</name>
       <dataType>string</dataType>
       <defaultValue>null</defaultValue>
   </stateVariable>
   -<stateVariable sendEvents="no">
       <name>SendStatus</name>
       <dataType>string</dataType>
       <defaultValue>null</defaultValue>
   </stateVariable>
   -<stateVariable sendEvents="no">
       <name>Recipient</name>
       <dataType>string</dataType>
       <defaultValue>null</defaultValue>
   </stateVariable>
   -<stateVariable sendEvents="no">
       <name>Message</name>
       <dataType>string</dataType>
       <defaultValue>null</defaultValue>
   </stateVariable>
   -<stateVariable sendEvents="no">
       <name>Status</name>
       <dataType>string</dataType>
       <defaultValue>null</defaultValue>
   </stateVariable>
   -<stateVariable sendEvents="yes">
       <name>ReceivedMessage</name>
       <dataType>string</dataType>
       <defaultValue>null</defaultValue>
   </stateVariable>
 </serviceStateTable>
</scpd>
```

A preliminary implementation of an exemplary IM remote control service was performed. A UPnP device which has the IM remote control service was also implemented. The device description for the UPnP device is provided below. The device description is written in XML.

```
<?xml version="1.0" ?>
-<root xmlns="urn:schemas-upnp-org:device-1-0">
  -<specVersion>
      <major>1</major>
      <minor>0</minor>
  </specVersion>
  <URLBase>http://
     192.168.0.10:5002/IMRemoteCtrlservicedevice</URLBase>
  -<device>
      <deviceType>urn:schemas-upnp-
          org:device:IMRemoteCtrlservicedevice:1</deviceType>
      <friendlyName>Sharp Instant Messenger Remote Control Service
          Device</friendlyName>
      <manufacturer>Sharp Labs of America Inc.</manufacturer>
      <manufacturerURL>/manufacturer.html</manufacturerURL>
      <modelDescription>An Instant Messenger Remote Control Service
          Device</modelDescription>
      <modelName>IMREMOTECTRLSVC V1</modelName>
      <modelNumber>0.1</modelNumber>
      <modelURL>/model.html</modelURL>
      <serialNumber>11242003</serialNumber>
      <UDN>uuid:IMRemoteCtrlservicedevice</UDN>
      <UPC>11242003</UPC>
    -<iconList>
      -<icon>
          <mimetype>image/gif</mimetype>
          <width>30</width>
          <height>30</height>
          <depth>8</depth>
          <url>icon.gif</url>
      </icon>
     </iconList>
    -<serviceList>
      -<service>
          <serviceType>urn:schemas-
             sharplabs.com:service:IMRCtrlSvc:1</serviceType>
          <serviceId>urn:schemas-
             sharplabs.com:serviceId:IMRCtrlSvc:1</serviceId>
          <SCPDURL>/IMRemoteCtrlservicedevice/urn_schemas-upnp-
             org_serviceId_IMRCtrlSvc_1/description.xml</SCPDURL>
          <controlURL>/IMRemoteCtrlservicedevice/urn_schemas-
             upnp-org_serviceId_IMRCtrlSvc_1/control</controlURL>
          <eventSubURL>/IMRemoteCtrlservicedevice/urn_schemas-
             upnp-
             org_serviceId_IMRCtrlSvc_1/eventSub</eventSubURL>
      </service>
     </serviceList>
      <presentationURL>http://192.168.0.10:5002/IMRemoteCtrlservice
          device/presentation.html</presentationURL>
  </device>
</root>
```

An exemplary IM remote control service was implemented in the UPnP device described above. The IM remote control service was implemented for a popular instant messenger client. Thus the IM client is developed which can expose the ability to be remotely controlled by any UPnP control point. The code was developed in Java. The operation of the UPnP service was verified to remotely login, send and receive instant messages, change status, and logoff. Instant Messenger software distribution was used as the IM client to communicate on the other side with a "buddy."

FIGS. 10A and 10B are screen shots corresponding to the invocation of the login action of the IM remote control service. As shown in FIG. 10A, a username and password was supplied on an IM network to login to the IM client remotely. FIG. 10B shows the successful invocation of the login action resulting in the user logging into the IM network remotely.

FIGS. 11A through 11B are screen shots corresponding to the invocation of the send message action of the IM remote control service. As shown in FIG. 11A, an instant message was sent to an IM recipient (username2) on an IM network. FIG. 11B shows the successful invocation of the send message action. This resulted in the IM recipient (username2) receiving the sent message.

Figure 12A:
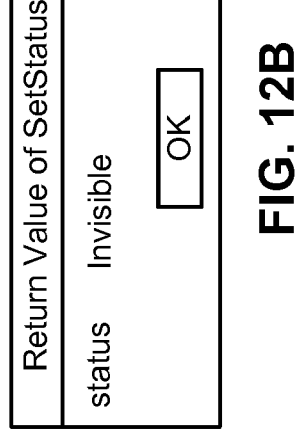
FIGS. 12A and 12B are screen shots corresponding to the invocation of the set status action of an exemplary implementation of the IM remote control service.
Figure 12B:
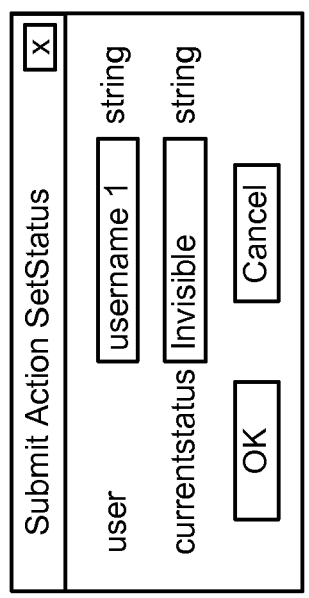

FIGS. 12A through 12B are screen shots corresponding to the invocation of the set status action of the IM remote control service. As shown in FIG. 12A, the online status was set to "invisible" for the username username1. FIG. 12B shows the successful invocation of the set status action resulting in the invisible status being set for the username username1.

Figure 13A:
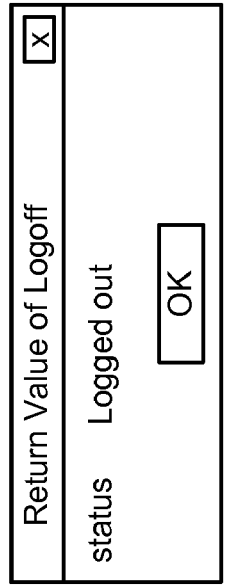
FIGS. 13A and 13B are screen shots corresponding to the invocation of the logoff action of an exemplary implementation of the IM remote control service.
Figure 13B:
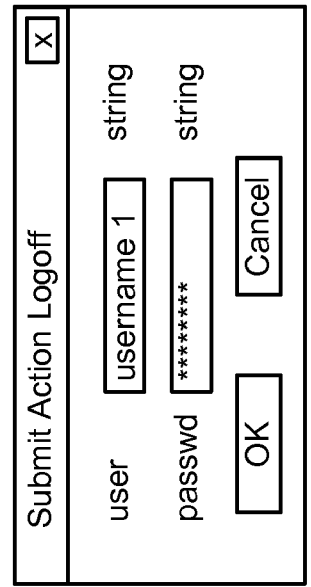

FIGS. 13A and 13B are screen shots corresponding to the invocation of the logoff action of the IM remote control service. FIG. 13A shows the successful invocation of the logoff action resulting in the user logging out of the IM network remotely. As shown in FIG. 13B, it was verified that the user was logged out of the IM network.

Figure 14:
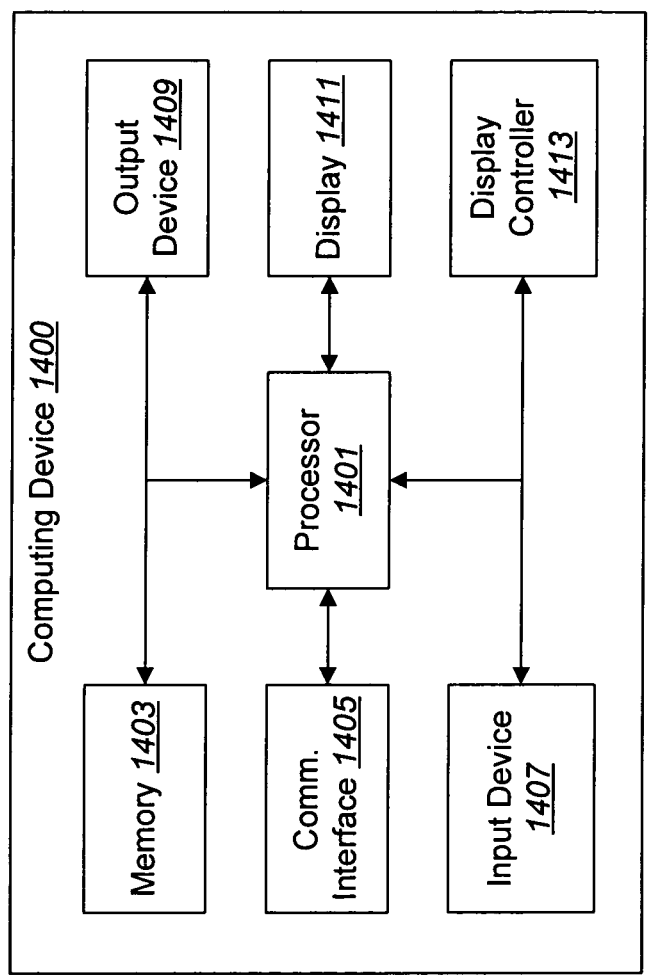
FIG. 14 is a block diagram illustrating the major hardware components typically utilized in a computing device, such as a UPnP device and a UPnP control point.

FIG. 14 is a block diagram illustrating the major hardware components typically utilized in a computing device 1400, such as a UPnP device 102 and a UPnP control point 104. The illustrated components may be located within the same physical structure or in separate housings or structures.

The computing device 1400 includes a processor 1401 and memory 1403. The processor 1401 controls the operation of the computing device 1400 and may be embodied as a microprocessor, a microcontroller, a digital signal processor (DSP) or other device known in the art. The processor 1401 typically performs logical and arithmetic operations based on program instructions stored within the memory 1403.

As used herein, the term memory 1403 is broadly defined as any electronic component capable of storing electronic information, and may be embodied as read only memory (ROM), random access memory (RAM), magnetic disk storage media, optical storage media, flash memory devices in RAM, on-board memory included with the processor 1401, EPROM memory, EEPROM memory, registers, etc. The memory 1403 typically stores program instructions and other types of data. The program instructions may be executed by the processor 1401 to implement some or all of the methods disclosed herein.

The computing device 1400 typically also includes one or more communication interfaces 1405 for communicating with other electronic devices. The communication interfaces 1405 may be based on wired communication technology, wireless communication technology, or both. Examples of different types of communication interfaces 1405 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 1400 typically also includes one or more input devices 1407 and one or more output devices 1409. Examples of different kinds of input devices 1407 include a keyboard, mouse, microphone, remote control device, button, joystick, trackball, touchpad, lightpen, etc. Examples of different kinds of output devices 1409 include a speaker, printer, etc. One specific type of output device which is typically included in a computer system is a display device 1411. Display devices 1411 used with embodiments disclosed herein may utilize any suitable image projection technology, such as a cathode ray tube (CRT), liquid crystal display (LCD), light-emitting diode (LED), gas plasma, electroluminescence, or the like. A display controller 1413 may also be provided, for converting data stored in the memory 1403 into text, graphics, and/or moving images (as appropriate) shown on the display device 1411.

Of course, FIG. 14 illustrates only one possible configuration of a computing device 1400. Those skilled in the art will recognize that various other architectures and components may be utilized. In addition, various standard components are not illustrated in order to avoid obscuring aspects of the invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A non-transitory computer-readable medium for a device that is connected to a network, the computer-readable medium comprising executable instructions for:
    facilitating discovery of the device by a control point that is also connected to the network;
    transmitting a device description associated with the device to the control point, wherein the device description comprises a pointer to a description of an instant messaging remote control service; and
    transmitting the description of the instant messaging remote control service to the control point, wherein:
        the instant messaging remote control service permits a user of the control point to send instant messages from the control point via a software instant messaging client using an instant messaging account of the user,
        the control point does not include any part of the instant messaging client,
        the remote control instant messaging service and the instant messaging client are both on the device and not the control point,
        the description of the instant messaging remote control service defines an action for remotely controlling the instant messaging client and an evented state variable that models a state of the instant messaging client, wherein:
            the description of the instant messaging remote control service is an XML file,
            the XML file comprises an <actionList> element and a <serviceStateTable> element,
            the <actionList> element comprises a plurality of <action> elements that define actions to be performed by the instant messaging client,
            the plurality of <action> elements comprise a login action, a logoff action, a send message action, and a set status action,
            the <serviceStateTable> element comprises a plurality of <stateVariable> elements, and
            the plurality of <stateVariable> elements comprise state, username, password, send status, recipient, message, status, and received message,
        the instant messaging client on the device permits a user to send instant messages from the device by accessing the instant messaging client without using the instant messaging remote control service.

2. The computer-readable medium of claim 1, wherein the device is a UPnP device, wherein the control point is a UPnP control point, and wherein the instant messaging remote control service is a UPnP instant messaging remote control service.

3. The computer-readable medium of claim 1, wherein the computer-readable medium further comprises executable instructions for:
    receiving a request from the control point to execute the login action; and
    in response to receiving the request, causing the instant messaging client to attempt to login to an instant messaging network.

4. The computer-readable medium of claim 3, wherein the computer-readable medium further comprises executable instructions for returning a status of the login action to the control point.

5. The computer-readable medium of claim 3, wherein the login action takes an instant messaging username and password as input information.

6. The computer-readable medium of claim 1, wherein the computer-readable medium further comprises executable instructions for:
 receiving a request from the control point to execute the send message action; and
 in response to receiving the request, causing the instant messaging client to attempt to send an instant message via an instant messaging network.

7. The computer-readable medium of claim 6, wherein the computer-readable medium further comprises executable instructions for returning a status of the send message action to the control point.

8. The computer-readable medium of claim 6, wherein the send message action takes an instant messaging username and password as input information.

9. The computer-readable medium of claim 1, wherein the computer-readable medium further comprises executable instructions for:
 receiving a request from the control point to execute the set status action; and
 in response to receiving the request, causing the instant messaging client to attempt to set an online status of a user of the instant messaging client.

10. The computer-readable medium of claim 9, wherein the computer-readable medium further comprises executable instructions for returning a status of the set status action to the control point.

11. The computer-readable medium of claim 9, wherein the set status action takes an instant messaging username and password as input information.

12. The computer-readable medium of claim 1, wherein the computer-readable medium further comprises executable instructions for:
 receiving a request from the control point to execute the logoff action; and
 in response to receiving the request, causing the instant messaging client to attempt to logoff an instant messaging network.

13. The computer-readable medium of claim 12, wherein the computer-readable medium further comprises executable instructions for returning a status of the logoff action to the control point.

14. The computer-readable medium of claim 12, wherein the logoff action takes an instant messaging username and password as input information.

15. The computer-readable medium of claim 1, wherein the description of the instant messaging remote control service defines an add buddy action, and wherein the computer-readable medium further comprises executable instructions for:
 receiving a request from the control point to execute the add buddy action; and
 in response to receiving the request, causing the instant messaging client to attempt to add a buddy to a buddy list.

16. The computer-readable medium of claim 15, wherein the computer-readable medium further comprises executable instructions for returning a status of the add buddy action to the control point.

17. The computer-readable medium of claim 15, wherein the add buddy action takes an instant messaging username and password as input information.

18. The computer-readable medium of claim 1, wherein the description of the instant messaging remote control service defines a remove buddy action, and wherein the computer-readable medium further comprises executable instructions for:
 receiving a request from the control point to execute the remove buddy action; and
 in response to receiving the request, causing the instant messaging client to attempt to remove a buddy from a buddy list.

19. The computer-readable medium of claim 18, wherein the computer-readable medium further comprises executable instructions for returning a status of the remove buddy action to the control point.

20. The computer-readable medium of claim 18, wherein the remove buddy action takes an instant messaging username and password as input information.

21. The computer-readable medium of claim 1, wherein the received message variable is an evented state variable, and wherein the computer-readable medium further comprises executable instructions for:
 receiving a subscription message from the control point, wherein the subscription message comprises a request to receive notification when the received message evented state variable changes; and
 in response to the instant messaging client receiving an instant message via an instant messaging network, sending a notification message to the control point, wherein the notification message comprises the instant message.

22. The computer-readable medium of claim 1, wherein the description of the instant messaging remote control service defines a buddy list evented state variable, and wherein the computer-readable medium further comprises executable instructions for:
 receiving a subscription message from the control point, wherein the subscription message comprises a request to receive notification when the buddy list evented state variable changes; and
 in response to the instant messaging client receiving a buddy list via an instant messaging network, sending a notification message to the control point, wherein the notification message comprises the buddy list.

23. The computer-readable medium of claim 1, wherein the description of the instant messaging remote control service defines a buddy status evented state variable, and wherein the computer-readable medium further comprises executable instructions for:
 receiving a subscription message from the control point, wherein the subscription message comprises a request to receive notification when the buddy status evented state variable changes; and
 in response to the instant messaging client receiving notification via an instant messaging network of a status of a buddy, sending a notification message to the control point, wherein the notification message comprises an indication of the status of the buddy.

24. The computer-readable medium of claim 1, wherein the description of the instant messaging remote control service defines a buddy activity indication evented state variable, and wherein the computer-readable medium further comprises executable instructions for:
 receiving a subscription message from the control point, wherein the subscription message comprises a request to receive notification when the buddy activity indication evented state variable changes; and
 in response to the instant messaging client receiving notification via an instant messaging network of an action being taken by a buddy, sending a notification message to the control point, wherein the notification message comprises an indication of the action being taken by the buddy.

25. A non-transitory computer-readable medium for a control point that is connected to a network, the computer-readable medium comprising executable instructions for:
- discovering a device that is also connected to the network;
- retrieving a device description associated with the device, wherein the device description comprises a pointer to a description of an instant messaging remote control service; and
- retrieving the description of the instant messaging remote control service from the device, wherein:
  - the instant messaging remote control service permits a user of the control point to send instant messages from the control point via a software instant messaging client using an instant messaging account of the user,
  - the control point does not include any part of the instant messaging client,
  - the remote control instant messaging service and the instant messaging client are both on the device and not the control point,
  - the description of the instant messaging remote control service defines an action for remotely controlling the instant messaging client and an evented state variable that models a state of the instant messaging client, wherein:
    - the description of the instant messaging remote control service is an XML file,
    - the XML file comprises an <actionList> element and a <serviceStateTable> element,
    - the <actionList> element comprises a plurality of <action> elements that define actions to be performed by the instant messaging client,
    - the plurality of <action> elements comprise a login action, a logoff action, a send message action, and a set status action,
    - the <serviceStateTable> element comprises a plurality of <stateVariable> elements, and
    - the plurality of <stateVariable> elements comprise state, username, password, send status, recipient, message, status, and received message variables,
  - the instant messaging client on the device permits a user to send instant messages from the device by accessing the instant messaging client without using the instant messaging remote control service.

26. The computer-readable medium of claim 25, wherein the device is a UPnP device, wherein the control point is a UPnP control point, and wherein the instant messaging remote control service is a UPnP instant messaging remote control service.

27. The computer-readable medium of claim 25, wherein the computer-readable medium further comprises executable instructions for sending a request to the instant messaging remote control service to execute the login action, and wherein in response to receiving the request the instant messaging remote control service causes the instant messaging client to attempt to login to an instant messaging network and to report a status of the attempt to the control point.

28. The computer-readable medium of claim 25, wherein the computer-readable medium further comprises executable instructions for sending a request to the instant messaging remote control service to execute the send message action, and wherein in response to receiving the request the instant messaging remote control service causes the instant messaging client to attempt to send an instant message via an instant messaging network and to report a status of the attempt to the control point.

29. The computer-readable medium of claim 25, wherein the computer-readable medium further comprises executable instructions for sending a request to the instant messaging remote control service to execute the set status action, and wherein in response to receiving the request the instant messaging remote control service causes the instant messaging client to attempt to set an online status of a user of the instant messaging client and to report a status of the attempt to the control point.

30. The computer-readable medium of claim 25, wherein the computer-readable medium further comprises executable instructions for sending a request to the instant messaging remote control service to execute the logoff action, and wherein in response to receiving the request the instant messaging remote control service causes the instant messaging client to attempt to logoff an instant messaging network and to report a status of the attempt to the control point.

31. The computer-readable medium of claim 25, wherein the description of the instant messaging remote control service defines an add buddy action, wherein the computer-readable medium further comprises executable instructions for sending a request to the instant messaging remote control service to execute the add buddy action, and wherein in response to receiving the request the instant messaging remote control service causes the instant messaging client to attempt to add a buddy to a buddy list and to report a status of the attempt to the control point.

32. The computer-readable medium of claim 25, wherein the description of the instant messaging remote control service defines a remove buddy action, wherein the computer-readable medium further comprises executable instructions for sending a request to the instant messaging remote control service to execute the remove buddy action, and wherein in response to receiving the request the instant messaging remote control service causes the instant messaging client to attempt to remove a buddy from a buddy list and to report a status of the attempt to the control point.

33. The computer-readable medium of claim 25, wherein the received message variable is an evented state variable, and wherein the computer-readable medium further comprises executable instructions for:
- sending a subscription message to the instant messaging remote control service, wherein the subscription message comprises a request to receive notification when the received message evented state variable changes; and
- receiving a notification message from the instant messaging remote control service in response to the instant messaging client receiving an instant message, wherein the notification message comprises the instant message.

34. The computer-readable medium of claim 25, wherein the description of the instant messaging remote control service defines a buddy list evented state variable, and wherein the computer-readable medium further comprises executable instructions for:
- sending a subscription message to the instant messaging remote control service, wherein the subscription message comprises a request to receive notification when the buddy list evented state variable changes; and
- receiving a notification message from the instant messaging remote control service in response to the instant messaging client receiving a buddy list via an instant messaging network, wherein the notification message comprises the buddy list.

35. The computer-readable medium of claim 25, wherein the description of the instant messaging remote control service defines a buddy status evented state variable, and wherein the computer-readable medium further comprises executable instructions for:

sending a subscription message to the instant messaging remote control service, wherein the subscription message comprises a request to receive notification when the buddy status evented state variable changes; and receiving a notification message from the instant messaging remote control service in response to the instant messaging client receiving notification via an instant messaging network of a status of a buddy, wherein the notification message comprises an indication of the status of the buddy.

36. The computer-readable medium of claim 25, wherein the description of the instant messaging remote control service defines a buddy activity indication evented state variable, and wherein the computer-readable medium further comprises executable instructions for:

sending a subscription message to the instant messaging remote control service, wherein the subscription message comprises a request to receive notification when the buddy activity indication evented state variable changes; and receiving a notification message from the instant messaging remote control service in response to the instant messaging client receiving notification via an instant messaging network of an action being taken by a buddy, wherein the notification message comprises an indication of the action being taken by the buddy.

37. A device that is configured for electronic communication with a network, comprising:

a processor;

memory in electronic communication with the processor;

instructions stored in the memory, the instructions being executable to:

connect to the network;

facilitate discovery of the device by a control point that is also connected to the network;

transmit a device description associated with the device to the control point, wherein the device description comprises a pointer to a description of an instant messaging remote control service; and transmit the description of the instant messaging remote control service to the control point, wherein:

the instant messaging remote control service permits a user of the control point to send instant messages from the control point via a software instant messaging client using an instant messaging account of the user, the control point does not include any part of the instant messaging client, the remote control instant messaging service and the instant messaging client are both on the device and not the control point, the description of the instant messaging remote control service defines an action for remotely controlling the instant messaging client and an evented state variable that models a state of the instant messaging client, wherein:

the description of the instant messaging remote control service is an XML file, the XML file comprises an <actionList> element and a <serviceStateTable> element, the <actionList> element comprises a plurality of <action> elements that define actions to be performed by the instant messaging client, the plurality of <action> elements comprise a login action, a logoff action, a send message action, and a set status action, the <serviceStateTable> element comprises a plurality of <stateVariable> elements, and the plurality of <stateVariable> elements comprise state, username, password, send status, recipient, message, status, and received message variables, the instant messaging client on the device permits a user to send instant messages from the device by accessing the instant messaging client without using the instant messaging remote control service.

38. The device of claim 37, wherein the device is a UPnP device, wherein the control point is a UPnP control point, and wherein the instant messaging remote control service is a UPnP instant messaging remote control service.

39. The device of claim 37, wherein the action for remotely controlling the instant messaging client is selected from the group consisting of the login action, the send message action, the set status action, the logoff action, an add buddy action, and a remove buddy action, wherein the received message variable is an evented state variable, and wherein the evented state variable is selected from the group consisting of the received message evented state variable, a buddy list evented state variable, a buddy status evented state variable, and a buddy activity indication evented state variable.

40. A control point that is configured for electronic communication with a network, comprising:

a processor;

memory in electronic communication with the processor;

instructions stored in the memory, the instructions being executable to:

connect to the network;

discover a device that is also connected to the network;

retrieve a device description associated with the device, wherein the device description comprises a pointer to a description of an instant messaging remote control service; and retrieve the description of the instant messaging remote control service from the device, wherein:

the instant messaging remote control service permits a user of the control point to send instant messages from the control point via a software instant messaging client using an instant messaging account of the user, the control point does not include any part of the instant messaging client, the remote control instant messaging service and the instant messaging client are both on the device and not the control point, the description of the instant messaging remote control service defines an action for remotely controlling the instant messaging client and an evented state variable that models a state of the instant messaging client, wherein:

the description of the instant messaging remote control service is an XML file, the XML file comprises an <actionList> element and a <serviceStateTable> element, the <actionList> element comprises a plurality of <action> elements that define actions to be performed by the instant messaging client, the plurality of <action> elements comprise a login action, a logoff action, a send message action, and a set status action, the <serviceStateTable> element comprises a plurality of <stateVariable> elements, and the plurality of <stateVariable> elements comprise state, username, password, send status, recipient, message, status, and received message variables, the instant messaging client on the device permits a user to send instant messages from the device by accessing the instant messaging client without using the instant messaging remote control service.

41. The control point of claim 40, wherein the device is a UPnP device, wherein the control point is a UPnP control point, and wherein the instant messaging remote control service is a UPnP instant messaging remote control service.

42. The control point of claim 40, wherein the action for remotely controlling the instant messaging client is selected from the group consisting of the login action, the send message action, the set status action, the logoff action, an add buddy action, and a remove buddy action, wherein the received message variable is an evented state variable, and wherein the evented state variable is selected from the group consisting of the received message evented state variable, a buddy list evented state variable, a buddy status evented state variable, and a buddy activity indication evented state variable.

43. In a device that is connected to a network, a method comprising:
  facilitating discovery of the device by a control point that is also connected to the network;
  transmitting a device description associated with the device to the control point, wherein the device description comprises a pointer to a description of an instant messaging remote control service; and
  transmitting the description of the instant messaging remote control service to the control point, wherein:
    the instant messaging remote control service permits a user of the control point to send instant messages from the control point via a software instant messaging client using an instant messaging account of the user,
    the control point does not include any part of the instant messaging client,
    the remote control instant messaging service and the instant messaging client are both on the device and not the control point,
    the description of the instant messaging remote control service defines an action for remotely controlling the instant messaging client and an evented state variable that models a state of the instant messaging client, wherein:
      the description of the instant messaging remote control service is an XML file,
      the XML file comprises an <actionList> element and a <serviceStateTable> element,
      the <actionList> element comprises a plurality of <action> elements that define actions to be performed by the instant messaging client,
      the plurality of <action> elements comprise a login action, a logoff action, a send message action, and a set status action,
      the <serviceStateTable> element comprises a plurality of <stateVariable> elements, and
      the plurality of <stateVariable> elements comprise state, username, password, send status, recipient, message, status, and received message variables,
    the instant messaging client on the device permits a user to send instant messages from the device by accessing the instant messaging client without using the instant messaging remote control service.

44. The method of claim 43, wherein the device is a UPnP device, wherein the control point is a UPnP control point, and wherein the instant messaging remote control service is a UPnP instant messaging remote control service.

45. The method of claim 43, wherein the action for remotely controlling the instant messaging client is selected from the group consisting of the login action, the send message action, the set status action, the logoff action, an add buddy action, and a remove buddy action, wherein the received message variable is an evented state variable, and wherein the evented state variable is selected from the group consisting of the received message evented state variable, a buddy list evented state variable, a buddy status evented state variable, and a buddy activity indication evented state variable.

46. In a control point that is connected to a network, a method comprising:
  discovering a device that is also connected to the network;
  retrieving a device description associated with the device, wherein the device description comprises a pointer to a description of an instant messaging remote control service; and
  retrieving the description of the instant messaging remote control service from the device, wherein:
    the instant messaging remote control service permits a user of the control point to send instant messages from the control point via a software instant messaging client using an instant messaging account of the user,
    the control point does not include any part of the instant messaging client,
    the remote control instant messaging service and the instant messaging client are both on the device and not the control point,
    the description of the instant messaging remote control service defines an action for remotely controlling the instant messaging client and an evented state variable that models a state of the instant messaging client, wherein:
      the description of the instant messaging remote control service is an XML file,
      the XML file comprises an <actionList> element and a <serviceStateTable> element,
      the <actionList> element comprises a plurality of <action> elements that define actions to be performed by the instant messaging client,
      the plurality of <action> elements comprise a login action, a logoff action, a send message action, and a set status action,
      the <serviceStateTable> element comprises a plurality of <stateVariable> elements, and
      the plurality of <stateVariable> elements comprise state, username, password, send status, recipient, message, status, and received message variables,
    the instant messaging client on the device permits a user to send instant messages from the device by accessing the instant messaging client without using the instant messaging remote control service.

47. The method of claim 46, wherein the device is a UPnP device, wherein the control point is a UPnP control point, and wherein the instant messaging remote control service is a UPnP instant messaging remote control service.

48. The method of claim 46, wherein the action for remotely controlling the instant messaging client is selected from the group consisting of the login action, the send message action, the set status action, the logoff action, an add buddy action, and a remove buddy action, wherein the received message variable is an evented state variable, and wherein the evented state variable is selected from the group consisting of the received message evented state variable, a buddy list evented state variable, a buddy status evented state variable, and a buddy activity indication evented state variable.

49. The computer-readable medium of claim 1, wherein the device is a personal computer and the control point is a television.

50. The computer-readable medium of claim 3, wherein the computer-readable medium further comprises executable instructions for returning a session identification to the control point if the login attempt is successful.

51. The computer-readable medium of claim 6, wherein the send message action takes a session identification as input information.

52. The computer-readable medium of claim 1, wherein the received message variable is an evented state variable, and wherein the description of the instant messaging remote control service defines the login action, the send message action, the set status action, the logoff action, an add buddy action, a remove buddy action, the received message evented state variable, a buddy list evented state variable, a buddy status evented state variable, a buddy activity indication evented state variable, a send audio message action, a received audio message evented state variable, a send video message action, a received video message evented state variable, a send file message action, a received file message evented state variable, an initiate conference action, and a buddy typing status evented state variable.

* * * * *